US012654708B2

(12) United States Patent
Carey et al.

(10) Patent No.: US 12,654,708 B2
(45) Date of Patent: Jun. 16, 2026

(54) AUXILIARY POWER UNIT POWER COMPENSATION USING GLOBAL POSITIONING SYSTEM FOR ALTITUDE

(71) Applicant: THERMO KING LLC, Minneapolis, MN (US)

(72) Inventors: Adam B Carey, Cottage Grove, MN (US); James Goodsell, Lakeville, MN (US)

(73) Assignee: THERMO KING LLC, Minneapolis, MN (US)

( * ) Notice: Subject to any disclaimer, the term of this patent is extended or adjusted under 35 U.S.C. 154(b) by 82 days.

(21) Appl. No.: 18/673,783

(22) Filed: May 24, 2024

(65) Prior Publication Data

US 2025/0360929 A1     Nov. 27, 2025

(51) Int. Cl.
　*B60W 40/00*　　　(2006.01)
　*B60W 40/02*　　　(2006.01)
　*G05B 15/02*　　　(2006.01)

(52) U.S. Cl.
　CPC ............. *B60W 40/02* (2013.01); *G05B 15/02* (2013.01); *B60W 2300/13* (2013.01)

(58) Field of Classification Search
　CPC .... B60W 40/02; B60W 2300/13; G05B 15/02
　USPC ............................................................ 701/1
　See application file for complete search history.

(56) References Cited

U.S. PATENT DOCUMENTS 9,062,633 B2　6/2015　Moravec et al.
9,371,754 B2　6/2016　Bloms et al.

| | | |
|---|---|---|
| 10,210,673 B2 | 2/2019 | Dudar |
| 11,046,192 B2 | 6/2021 | Aufdencamp |
| 11,448,108 B1 | 9/2022 | Dudar |
| 11,781,497 B1 | 10/2023 | Goodsell et al. |
| 2004/0034453 A1* | 2/2004 | Funk ........................ G01L 3/247 701/1 |
| 2009/0032679 A1 | 2/2009 | Holladay |
| 2015/0314670 A1* | 11/2015 | Lucht ..................... F25B 49/025 62/115 |
| 2023/0271598 A1* | 8/2023 | Onogawa ............ B60W 30/182 701/22 |
| 2024/0140392 A1* | 5/2024 | Boaretto ............... B60W 10/26 |

FOREIGN PATENT DOCUMENTS

CN　　　　111038484 A　*　4/2020　............ B60W 40/00

* cited by examiner

*Primary Examiner* — Helal A Algahaim
*Assistant Examiner* — Michael T Dowling
(74) *Attorney, Agent, or Firm* — HSML P.C.

(57) ABSTRACT

A transport power system is provided. The system includes a prime mover separate from a vehicle engine; a global positioning system (GPS) receiver configured to receive GPS data; and a controller configured to communicate with the prime mover and the GPS receiver. The controller is configured to determine an altitude of the transport power system with respect to sea level based on the GPS data received by the GPS receiver, determine a power output of the prime mover, adjust a power output upper limit for the prime mover based on the determined altitude, compare the power output of the prime mover and the adjusted power output upper limit, and operate the prime mover of the transport power system so as not to exceed the adjusted power output upper limit.

20 Claims, 6 Drawing Sheets

300

400

410

Receive GPS data

420

Determine altitude

430

Adjust power output limit

440

Operate TRS/TCCS within
the limit

AUXILIARY POWER UNIT POWER COMPENSATION USING GLOBAL POSITIONING SYSTEM FOR ALTITUDE

FIELD

This disclosure relates generally to adjusting a power output upper limit for a prime mover of a transport power system. More specifically, the disclosure relates to systems and methods for adjusting a power output upper limit for a prime mover of a transport power system that can be used, for example, for powering a transport climate control system (TCCS).

BACKGROUND

A transport climate control system (TCCS) can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a trailer, a container (such as a container on a flat car, an intermodal container, etc.), a box car, a semi-tractor, a passenger bus, or other similar transport unit). The TRS can maintain environmental condition(s) of the cargo space to maintain cargo (e.g., produce, frozen foods, pharmaceuticals, etc.). In some embodiments, the transport unit can include an HVAC system to control a climate within a passenger space of the vehicle.

SUMMARY

This disclosure relates generally to adjusting a power output upper limit for a prime mover of a transport power system. More specifically, the disclosure relates to systems and methods for adjusting a power output upper limit for a prime mover of a transport power system that can be used, for example, for powering a TCCS and having a global positioning system (GPS) receiver for determining altitude.

Embodiments disclosed herein can use a GPS receiver to deduce the altitude of the transport power system (e.g., during a start-up sequence of the transport power system prior to running of the prime mover or during other process sequence). Embodiments disclosed herein can provide a controller to adjust a power usage/limit of the prime mover based on the altitude of the transport power system.

It is to be understood that in some embodiments the prime mover (e.g., a diesel engine, a mechanical engine and/or hybrid engine, or the like), is not solely an electronic engine. Also, the prime mover may not be the prime mover used for operating the vehicle. That is, the prime mover disclosed herein can be separate from and/or independent to the prime mover used for operating the vehicle. In some applications, when the prime mover used for operating the vehicle is running, the prime mover (e.g., a diesel engine of the transport power system, or the like) disclosed herein typically can be off, and vice versa.

In an example embodiment, a GPS receiver can be contained in a box (e.g., a telematics device, etc.) that is external to an auxiliary power unit (APU) and functioned to operate as e.g., a telematics-based datalogging device. The device can be configured to communicate bidirectionally with the APU (e.g., the controller, the remote input-out-put device, the human-machine interface, etc.) over a controller area network (CAN), allowing data to be sent to and from each device to the other. The GPS receiver can report to the APU the latitude and longitude data for device tracking, and report to the APU the altitude data. The altitude data can be used as an input to the APU control scheme to determine the power output upper limit. The altitude of the TCCS may range from e.g., sea level to a predefined altitude (e.g., a predefined elevation above sea level, etc.).

In an example embodiment, at sea level, a first maximum power output (e.g., having a unit of kilowatts, etc.) can be generated by the APU prime mover without violating the emission regulations (e.g., a limit under the not-to-exceed (NTE) regulation). At the predefined altitude, a second maximum power output, which is lower than the first maximum power output, can be generated by the APU prime mover without violating the emission regulations, because when the prime mover (of the APU) is used at higher altitude, emission performance may decrease. It is to be understood that without the capability to determine the altitude, to ensure emission regulation compliance, the predefined altitude may be assumed to be the default altitude, which may lead to decreased APU performance. Embodiments disclosed herein can use the GPS receiver to deduce the altitude of the transport power system, without changing the architecture of the system design, and thus reducing the cost and simplifying the system design.

In an embodiment, a transport power system is provided. The system includes a prime mover separate from a vehicle engine; a global positioning system (GPS) receiver configured to receive GPS data; and a controller configured to communicate with the prime mover and the GPS receiver. The controller is configured to determine an altitude of the transport power system with respect to sea level based on the GPS data received by the GPS receiver e.g., during a start-up sequence of the transport power system prior to running of the prime mover or during other process sequence, determine a power output of the prime mover, adjust a power output upper limit for the prime mover based on the determined altitude, compare the power output of the prime mover and the adjusted power output upper limit, and operate the prime mover of the transport power system so as not to exceed the adjusted power output upper limit.

In an embodiment, a method for controlling an operation of a transport power system is provided. The method includes determining, by a controller of the transport power system, an altitude of the transport power system with respect to sea level based on global positioning system (GPS) data received by a GPS receiver e.g., during a start-up sequence of the transport power system prior to running of a prime mover of the transport power system or during other process sequence. The prime mover is separate from and independent to a vehicle engine used for operating a vehicle. The controller is configured to communicate with the prime mover and the GPS receiver. The method also includes determining a power output of the prime mover; adjusting, by the controller, a power output upper limit for the prime mover based on the determined altitude; comparing the power output of the prime mover and the adjusted power output upper limit; and operating, by the controller, the prime mover of the transport power system so as not to exceed the adjusted power output upper limit.

Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

This disclosure relates generally to adjusting a power output upper limit for a prime mover of a transport power system. More specifically, the disclosure relates to systems and methods for adjusting a power output upper limit for a prime mover of a transport power system that can be used, for example, for powering a transport climate control system (TCCS) and having a GPS receiver for determining altitude.

It is to be understood that unless specified otherwise, a prime mover described herein refers to a prime mover of a transport power system (e.g., a prime mover of an auxiliary power unit (APU), a prime mover of a TCCS, or the like), but not to a vehicle prime mover. That is, in some embodiments, there can be two or more distinct diesel engines on a same vehicle: one can be a main/vehicle (e.g., tractor, truck, or the like) engine used to move the vehicle, and the other can be an auxiliary engine (e.g., a diesel-powered compression ignition engine) of the transport power system. Typically, when the main/vehicle engine is running, the auxiliary engine is off, and vice versa. It is to be understood that in some embodiments an electronic prime mover might not work with embodiments disclosed herein since emission regulation may not apply to electronic prime movers. Embodiments disclosed herein can be directed to the auxiliary diesel-powered compression ignition engine.

As defined herein, the phrase "global positioning system" or "GPS" may refer to a satellite-based radio navigation system. It is to be understood that GPS is one of the global navigation satellite systems (GNSS) that provides geolocation and time information to a GPS receiver and does not require the user to transmit any data. GPS satellites can broadcast signals from space, and each GPS receiver can use these signals to determine its three-dimensional location (latitude, longitude, and altitude) and the current time of receiving the signals. It is also to be understood that a GPS receiver may refer to a satellite navigation device, a satnav device, or a satellite navigation receiver, that is a user equipment that can use one or more of several global navigation satellite systems (GNSS) to determine the device's geographical position.

Embodiments disclosed herein can be applicable to e.g., box truck, self-powered truck, trailer, TRU, or the like, or dual prime mover system where a prime mover is independent of a vehicle prime mover. It is to be understood that the control of the components of the system can be performed by a controller (e.g., the APU controller, the TCCS controller, or the like). Also, the embodiments described herein can also be applicable to a hybrid power system that uses both a prime mover and a rechargeable energy storage (e.g., battery).

Figure 1A:
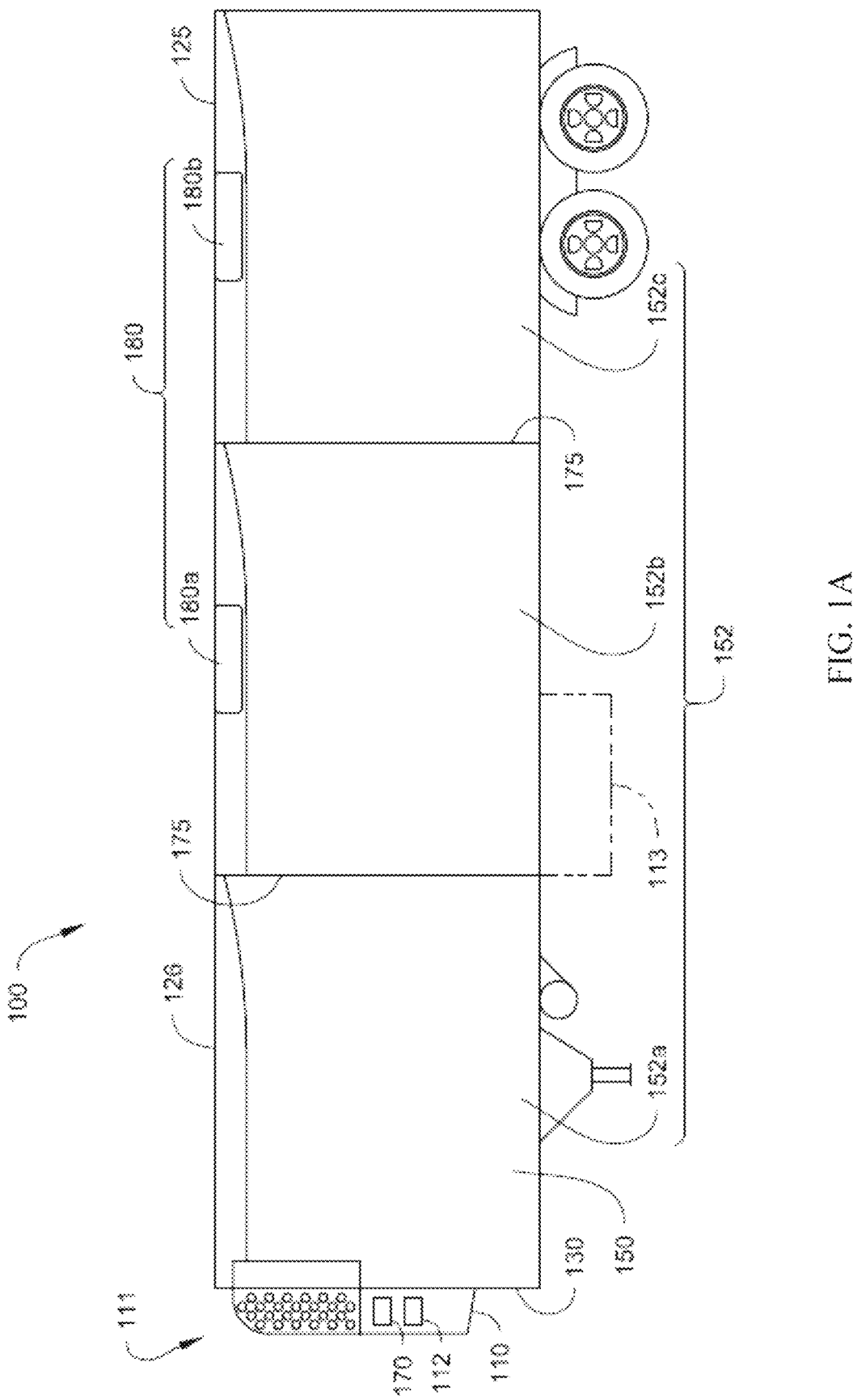
FIG. 1A illustrates a schematic cross sectional side view of a refrigerated transport unit with a multi-temp transport refrigeration system (MTRS), according to an embodiment.

FIG. 1A illustrates one embodiment of a MTRS 100 for a TU 125 that can be towed, for example, by a tractor (not shown). The MTRS 100 includes a TRU 110 and a plurality of remote heat exchanger units 180. The TRU 110 and each of the remote heat exchanger units 180 provide climate control (e.g. temperature, humidity, air quality, etc.) within a separate zone of the internal space 150. The TRU 110 can include, amongst other components, a refrigeration circuit that connects, for example, a compressor, a condenser, an evaporator and an expansion valve to provide climate control within the at least one of the zones of the internal space 150. Each of the remote heat exchanger units 180 can also be connected to the refrigeration circuit to provide climate control to a particular zone 152 of the internal space 150.

The internal space 150 is divided into a plurality of zones 152. The term "zone" means a part of an area of the internal space 150 separated by walls 175. In some examples, each of the zones 152 can maintain a set of environmental condition parameters (e.g. temperature, humidity, air quality, etc.) that is independent from other zones 152. Note that in FIG. 1A the internal space 150 is divided into three zones: a first zone 152a; a second zone 152b; and a third zone 152c. Each of the zones 152 shown in FIG. 1A is divided into substantially equal areas. However, it is to be realized that the internal space 150 may be divided into any number of zones in any size configuration that is suitable for environmental control of the different zones.

The MTRS 100 is configured to control and maintain separate environmental condition requirements in each of the zones 152. The MTRS 100 includes a refrigeration circuit (not shown) that fluidly connects a compressor (not shown), a condenser (not shown), a host unit 111, and a plurality of remote heat exchanger units 180. The TRU 110 includes the compressor, the condenser, and the host unit 111. The plurality of remote heat exchanger units 180 is disposed in the TU 125. The refrigeration circuit provides independent climate control for each of the first, second and third zones 152a-c. The host unit 111 provides climate control for the first zone 152a. The first remote heat exchanger unit 180a is disposed in the second zone 152b and provides climate control for the second zone 152b. The second remote heat exchanger unit 180b is disposed in the third zone 152c and provides climate control for the third zone 152c. The host unit 111 and the remote heat exchanger units 180 are collectively referred to herein as heat exchange units. It will be appreciated that in other embodiments the number of heat exchange units can vary based on the number of zones in the transport unit. For example, in a two zone TU, the MTRS can include a host unit for providing climate control to the first zone and a remote heat exchanger unit for providing climate control to the second zone.

In one embodiment, the first zone 152a can be a frozen temperature zone operating to maintain a temperature set point within a frozen temperature range and the second and third zones 152b, 152c can be fresh temperature zones operating to maintain a temperature set point within a fresh temperature range. In one embodiment, for example, the frozen temperature range can be between about −25° F. to about 15° F. and the fresh temperature range can be between about 16° F. to about 90° F. In another embodiment, for example, the frozen temperature range can be between about −25° F. to about 24° F. and the fresh temperature zone can be between about 26° F. to about 90° F. It will be appreciated that in other embodiments, any of the first, second and third zones 152*a-c* can be a fresh temperature zone operating to maintain a temperature set point within a fresh temperature range or a frozen temperature zone operating to maintain a temperature set point within a frozen temperature range.

The MTRS 100 also includes a MTRS controller 170 and one or more sensors (e.g., Hall effect sensors, current transducers, etc.) that are configured to measure one or more parameters (e.g., ambient temperature, compressor suction pressure, compressor discharge pressure, supply air temperature, return air temperature, humidity, etc.) of the MTRS 100 and communicate parameter data to the MTRS controller 170. The MTRS 100 is powered by a power module 112. The TRU 110 is disposed on a front wall 130 of the TU 125. In other embodiments, it is to be understood that the TRU 110 can be disposed, for example, on a rooftop 126 or another wall of the TU 125.

In some embodiments, the MTRS 100 can include an undermount unit 113. In some embodiments, the undermount unit 113 can be a TRU that can also provide environmental control (e.g. temperature, humidity, air quality, etc.) within the internal space 150 of the TU 125. The undermount unit 113 can work in combination with the TRU 110 to provide redundancy or can replace the TRU 110. Also, in some embodiments, the undermount unit 113 can be a power module that includes, for example, a generator that can help power the TRU 110.

The programmable MTRS Controller 170 may comprise a single integrated control unit or may comprise a distributed network of TRS control elements. The number of distributed control elements in a given network can depend upon the particular application of the principles described herein. The MTRS controller 170 is configured to control the operation of the MTRS 100.

As shown in FIG. 1A, the power module 112 is disposed in the TRU 110. In other embodiments, the power module 112 can be separate from the TRU 110. Also, in some embodiments, the power module 112 can include two or more different power sources disposed within or outside of the TRU 110. In some embodiments, the power module 112 can include one or more of a prime mover, a battery, an alternator, a generator, a solar panel, a fuel cell, etc. Also, the prime mover can be a combustion engine or a microturbine engine and can operate as a two-speed prime mover, a variable speed prime mover, etc. In some embodiments, a GPS receiver for determining the altitude can be provided. The power module 112 can provide power to, for example, the MTRS Controller 170, a compressor (not shown), a plurality of DC (Direct Current) components (not shown), a power management unit (not shown), etc. The DC components can be accessories or components of the MTRS 100 that require DC power to operate. Examples of the DC components can include, for example, DC fan motor(s) for a condenser fan or an evaporator blower (e.g., an Electrically Commutated Motor (ECM), a Brushless DC Motor (BLDC), etc.), a fuel pump, a drain tube heater, solenoid valves (e.g., controller pulsed control valves), etc.

The power module 112 can include a DC power source (not shown) for providing DC electrical power to the plurality of DC components (not shown), the power management unit (not shown), etc. The DC power source can receive mechanical and/or electrical power from, for example, a utility power source (e.g., Utility power, etc.), a prime mover (e.g., a combustion engine such as a diesel engine, etc.) coupled with a generator machine (e.g., a belt-driven alternator, a direct drive generator, etc.), etc. For example, in some embodiments, mechanical energy generated by a diesel engine is converted into electrical energy via a generator machine. The electrical energy generated via the belt driven alternator is then converted into DC electrical power via, for example, a bi-directional voltage converter. The bi-directional voltage converter can be a bi-directional multi-battery voltage converter.

The internal space 150 can be divided into a plurality of zones 152. The term "zone" means a part of an area of the internal space 150 separated by walls 175. It is to be understood that the invention disclosed herein can also be used in a single zone TRS.

The MTRS 100 for the TU 125 includes the TRU 110 and a plurality of remote heat exchanger units 180. In some embodiments, an HVAC system can be powered by an Auxiliary Power Unit (APU, see FIG. 1B). The APU can be operated when a main prime mover of the TU 125 is turned off such as, for example, when a driver parks the TU 125 for an extended period of time to rest. The APU can provide, for example, power to operate a secondary HVAC system to provide conditioned air to a cabin of the tractor (not shown). The APU can also provide power to operate cabin accessories within the cabin such as a television, a microwave, a coffee maker, a refrigerator, etc. The APU can be a mechanically driven APU (e.g., prime mover driven).

The tractor includes a vehicle electrical system for supplying electrical power to the electrical loads of the tractor, the MTRS 100, and/or the TU 125.

Figure 1B:
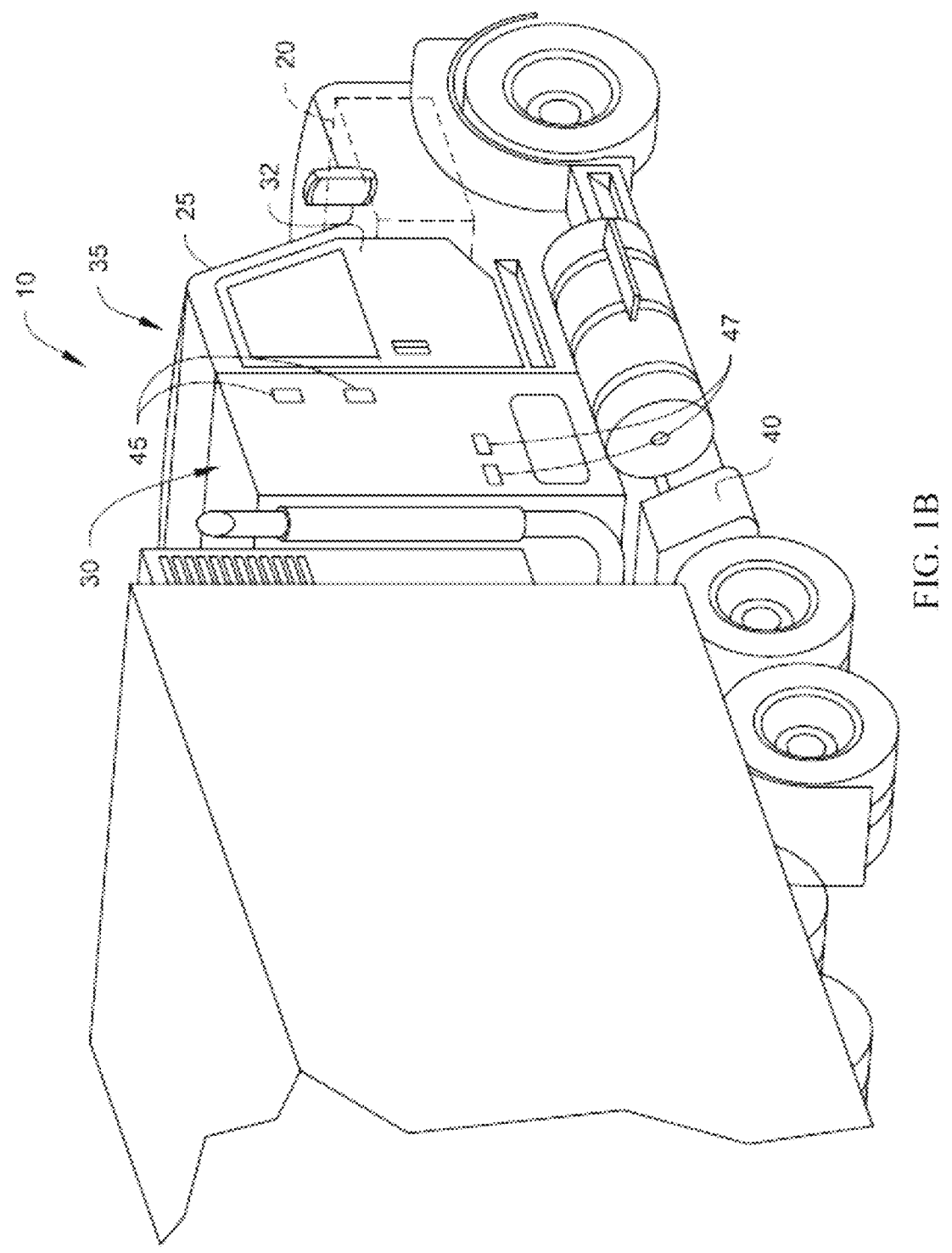
FIG. 1B illustrates a perspective view of a vehicle with an auxiliary power unit, according to an embodiment.

FIG. 1B illustrates a vehicle 10 according to one embodiment. The vehicle 10 is a semi-tractor that is used to transport cargo stored in a cargo compartment (e.g., a container, a trailer, etc.) to one or more destinations. Hereinafter, the term "vehicle" shall be used to represent all such tractors and trucks, and shall not be construed to limit the present application solely to a tractor in a tractor-trailer combination. In some embodiments, the vehicle 10 can be, for example, a straight truck, van, etc.

The vehicle 10 includes a primary power source 20, a cabin 25 defining a sleeping portion 30 and a driving portion 35, an APU 40, and a plurality of vehicle accessory components 45 (e.g., electronic communication devices, cabin lights, a primary and/or secondary HVAC system, primary and/or secondary HVAC fan(s), sunshade(s) for a window/ windshield of the vehicle 10, cabin accessories, etc.). The cabin 25 can be accessible via a driver side door (not shown) and a passenger side door 32. The cabin 25 can include a primary HVAC system (not shown) that can be configured to provide conditioned air within driving portion 35 and potentially the entire cabin 25, and a secondary HVAC system (not shown) for providing conditioned air within the sleeping portion 30 of the cabin 25. The cabin 25 can also include a plurality of cabin accessories (not shown). Examples of cabin accessories can include, for example, a refrigerator, a television, a video game console, a microwave, device charging station(s), a continuous positive airway pressure (CPAP) machine, a coffee maker, a secondary HVAC system for providing conditioned air to the sleeping portion 30.

The primary power source 20 can provide sufficient power to operate (e.g., drive) the vehicle 10 and any of the plurality of vehicle accessory components 45 and cabin accessory components 47. The primary power source 20 can also provide power to the primary HVAC system and the secondary HVAC system. In some embodiments, the primary power source can be a prime mover such as, for example, a combustion engine (e.g., a diesel engine, etc.).

The APU 40 is a secondary power unit for the vehicle 10 when the primary power source 20 is unavailable. When, for example, the primary power source 20 is unavailable, the APU 40 can be configured to provide power to one or more of the vehicle accessory components, the cabin accessories, the primary HVAC system and the secondary HVAC system. In some embodiments, the APU 40 can be an electric powered APU. In other embodiments, the APU 40 can be a prime mover powered APU. The APU 40 can be attached to the vehicle 10 using any attachment method. In some embodiments, the APU 40 can be turned on (i.e., activated) or off (i.e., deactivated) by an occupant (e.g., driver or passenger) of the vehicle 10. The APU 40 generally does not provide sufficient power for operating (e.g., driving) the vehicle 10. The APU 40 can be controlled by an APU controller 41. In some embodiments, a GPS receiver for determining the altitude can be provided.

Figure 1C:
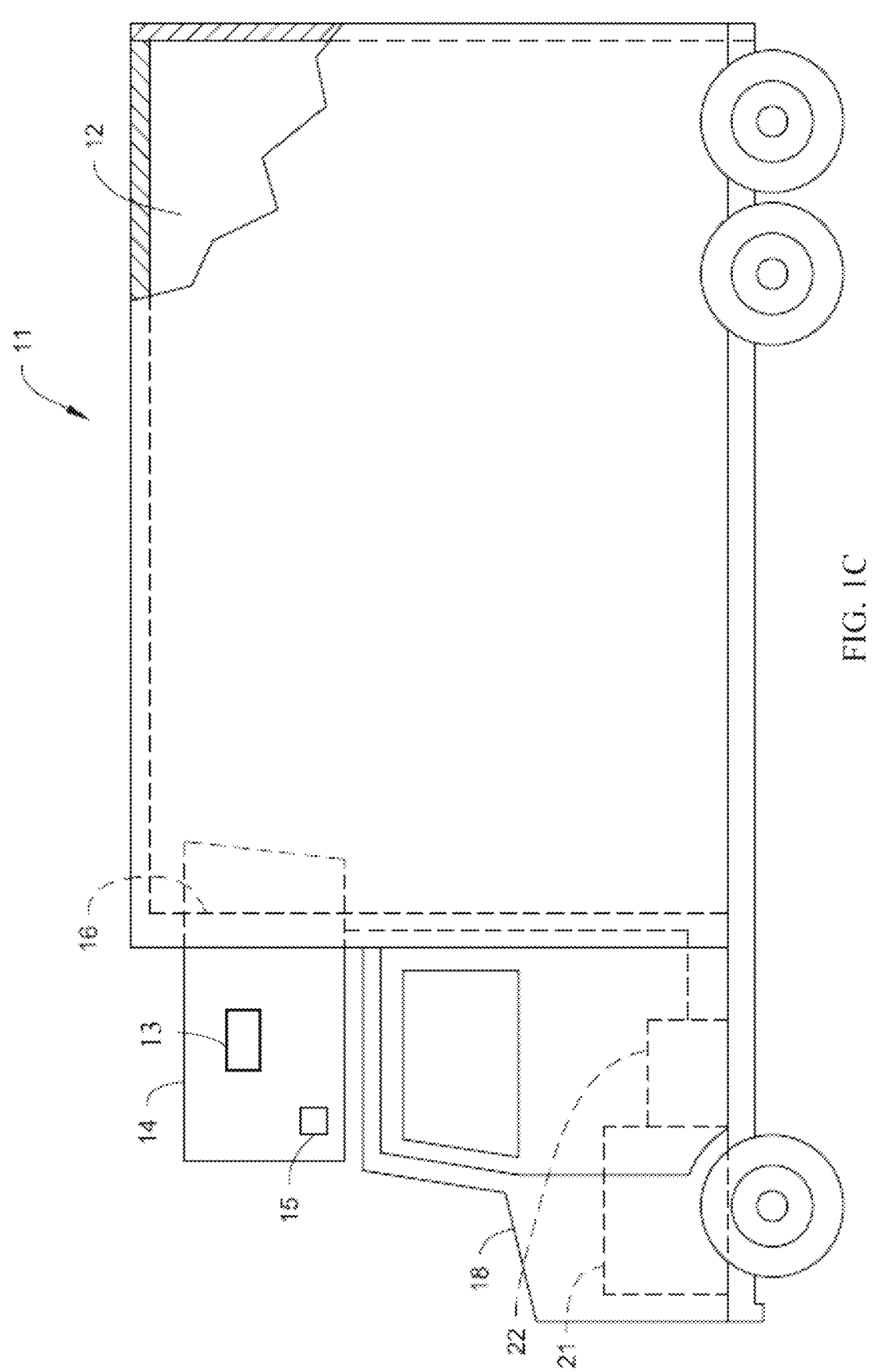
FIG. 1C illustrates a side view of a truck with a front wall mounted vehicle powered transport refrigeration unit, according to an embodiment.

FIG. 1C depicts a temperature-controlled straight truck 11 that includes a conditioned load space 12 for carrying cargo. A transport refrigeration unit (TRU) 14 is mounted to a front wall 16 of the load space 12. The TRU 14 is controlled via a controller 15 to provide temperature control within the load space 12. The truck 11 further includes a vehicle power bay 18, which houses a truck prime mover 21, such as a combustion engine (e.g., diesel engine, etc.), that provides power to move the truck 11. In some embodiments, the truck prime mover 21 can work in combination with an optional machine 22 (e.g., an alternator). The TRU 14 includes a prime mover 13. In an embodiment, the prime mover 13 can be a combustion engine (e.g., diesel engine, etc.) to provide power to the TRU 14. In some embodiments, a GPS receiver for determining the altitude can be provided. In one embodiment, the TRU 14 includes a vehicle electrical system. Also, in some embodiments, the TRU 14 can be powered by the prime mover 13 in combination with a battery power source or by the optional machine 22. In some embodiments, the TRU 14 can also be powered by the truck prime mover 21 in combination with a battery power source or the optional machine 22.

While FIG. 1C illustrates a temperature-controlled straight truck 11, it is to be understood that the embodiments described herein can also apply to any other type of transport unit including, but not limited to, a van, a container (such as a container on a flat car, an intermodal container, etc.), a box car, or other similar transport unit.

Figure 2:
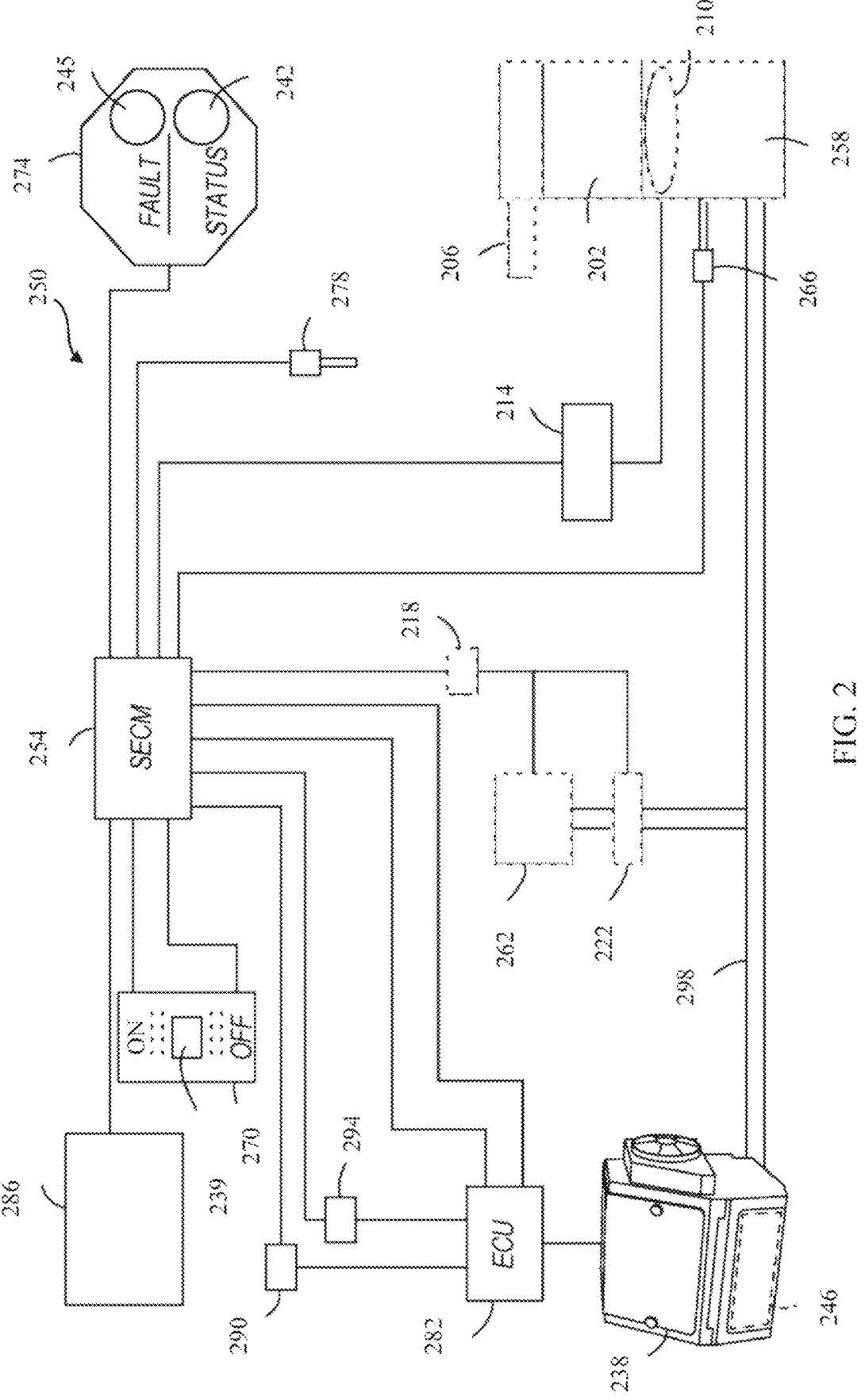
FIG. 2 is a schematic of an auxiliary power unit with an exhaust system, according to an embodiment.

FIG. 2 is a schematic of an auxiliary power unit (APU) 238 with an exhaust system 250, according to an embodiment. As shown in FIG. 2, the exhaust system 250 can be coupled to the auxiliary power unit 238. In an embodiment, the illustrated exhaust system 250 can include a control module 254, an optional diesel particulate filter (DPF) 258 (that may include a filter element 202, a heating element 210, and an outlet 206), an optional blower 262, an optional relay 218, an optional valve 222, an optional pressure sensor 266, a control switch 270 including a light emitting diode 239 (LED), a system indicator 274 including a first LED 242 and a second LED 245, a contactor 214, an exhaust pipe 298, and/or an ambient temperature sensor 278. The control module 254 can be electrically coupled to an electronic control unit 282 (ECU) of the auxiliary power unit 238 and to the other components of the exhaust system 250 to receive, process, and transmit information to and from the components. In some embodiments, the optional pressure sensor 266 can be a single pressure sensor such as an absolute pressure sensor as opposed to a gauge pressure sensor, and can be configured to sense an absolute pressure that can produce readings that are not influenced by atmospheric pressure or weather. In an example embodiment, the system 250 does not include the DPF or the pressure sensor.

It is to be understood that controls described herein can be performed by a controller (e.g., control module 254, the controller of the transport refrigeration unit/system of FIGS. 1A and 1C, the controller of the APU of FIG. 1B, or the like). The controller can connect to and control the components via e.g., wireless or wired connections. The control module 254 can also be coupled to an ignition 286 of the vehicle (see vehicle 10 of FIG. 1B) such that the control module 254 receives status information from the primary mover (see prime mover 20 of FIG. 1B) of the vehicle 10. In the illustrated construction, the control module 254 can be a small engine control module (SECM) that is compatible with the prime mover (e.g., a diesel engine or the like) 246 of the auxiliary power unit 238. The prime mover 246 can be, for example, a prime mover of the APU, a prime mover of the transport refrigeration unit/system of FIGS. 1A and 1C, or the like. In some embodiments, the prime mover 246 is separate from a prime mover used for operating a vehicle. The control module 254 receives ignition and engine running status from the auxiliary power unit 238 so that the control module 254 can monitor when and at what strength the auxiliary power unit 238 is running. The control module 254 is also operable to send signals to the ECU 282 through relays 290, 294 to interrupt and/or shutdown operation of the auxiliary power unit 238.

The ambient temperature sensor 278 can be electrically coupled to the control module 254 and is mounted to the frame or the body of the vehicle 10 (see FIG. 1B). In the illustrated construction, the temperature sensor 278 can be a thermistor or other suitable temperature sensing transducer. The temperature sensor 278 can monitor the temperature of the environment and outputs a signal indicative of the measured temperature to the control module 254.

It is to be understood that the APU 238 or the TRU or the TCCS can include sensors (e.g., temperature, pressure, humidity, motion, voltage, current, battery status, battery charging level, or the like) or the APU 238 or the TRU or the TCCS can communicate with sensors associated or embedded with a cargo. The controller 254 of the APU 238 or the TRU or the TCCS can obtain data sensed by the sensors and control the settings of the components (e.g., the prime mover 246) of the TCCS or the APU 238. In an embodiment, the prime mover 246 of the APU 238 can be a combustion engine (e.g., a diesel engine, or the like). The APU 238 can be configured to provide power to operate a plurality of cabin accessories such as a refrigerator, a television, a video game console, a microwave, device charging station(s), a continuous positive airway pressure (CPAP) machine, a coffee maker, a secondary HVAC system (that is independent to and/or in addition to a primary HVAC system) for providing conditioned air to the sleeping portion of the cabin. The primary HVAC system and/or the secondary HVAC system can each include a compressor (not shown).

Figure 3:
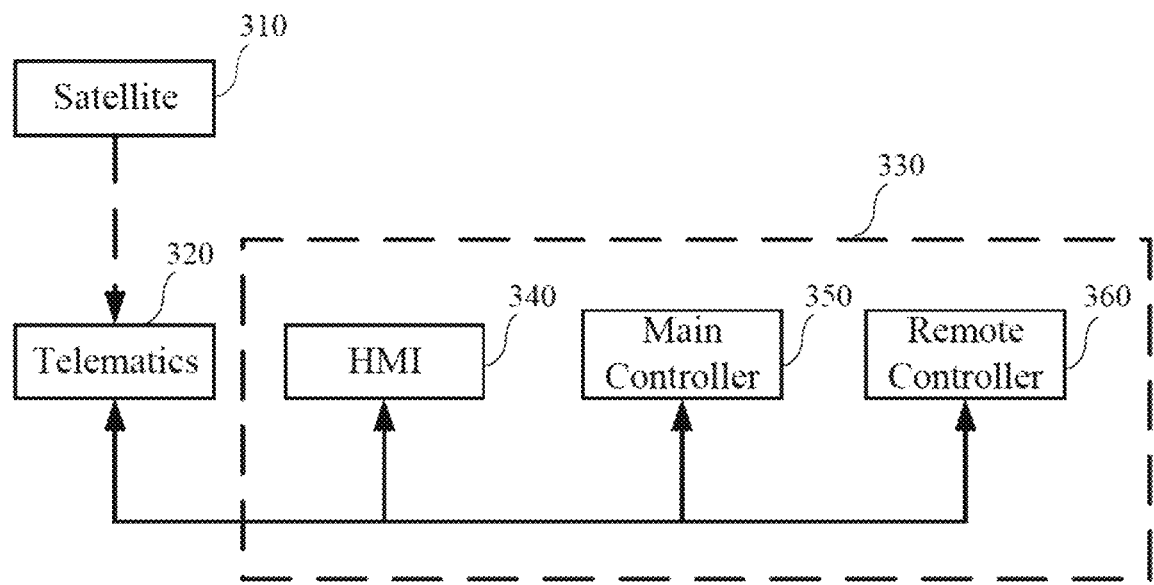
FIG. 3 is a schematic view of an example transport power control system, according to an embodiment.

FIG. 3 is a schematic view of an example transport power control system 300, according to an embodiment.

In an embodiment, the system 300 includes a subsystem 330. The subsystem 330 can be an APU control system (of an APU) including a controller 350, a human-machine interface (HMI) device 340, and/or an input-output device 360. The APU can be the APU 40 of FIG. 1B, the APU 238 of FIG. 2, etc. The controller 350 can be the controller 41 of FIG. 1B, the controller 254 of FIG. 2, etc. In an embodiment, the controller 350 can be a main controller. In an embodiment, the input-output device 360 can be a remote controller (e.g., separate from and/or independent to the main controller) configured to execute commands or instructions from the controller 350.

In an embodiment, the HMI device 340 can be disposed within the cabin, e.g., the cabin 25 of FIG. 1B. The HMI device 340 can be configured to allow a user (e.g., a driver, an operator, etc.) to configure, setup, and/or input instructions, configurations, parameters, operation modes, etc. to the subsystem 330. The HMI device 340 can also be configured to display data (e.g., current configurations, operation modes, parameters, etc.) from the subsystem 330.

In an embodiment, the system 300 includes a GPS receiver. The GPS receiver can be contained in a telematics device 320. In an embodiment, the GPS receiver can be the telematics device 320 or an integral part of the telematics device 320. In another embodiment, the GPS receiver can be a device independent to the telematics device 320. The GPS receiver is configured to receive signals from satellite 310 (e.g., GPS satellite(s)) to determine the latitude, longitude, and altitude of the GPS receiver.

In an embodiment, the telematics device 320 can be a telematics-based datalogging device configured to e.g., receive and store data such as the APU or TCCS operations, parameters and/or statistics of the components of the APU or TCCS such as the operational mode (cooling, heating, etc.), the prime mover's running parameters such as the prime mover's coolant temperatures and the prime mover's revolutions per minute (RPM), and/or other operating parameters of the APU or TCCS. In an embodiment, the telematics device 320 may receive the data from other components of the APU or TCCS, store the data in a memory of the telematics device 320, and upload the data to cloud via a wireless communication. In an embodiment, the telematics device 320 is disposed outside of the cabin, e.g., the cabin 25 of FIG. 1B for better communication with the cloud or the GPS satellite 310. In an embodiment, the telematics device 320 is disposed external to the APU or TCCS.

In an embodiment, the components such as the telematics device 320, the HMI device 340, the remote controller 360, and the controller 350 can communicate with each other via a communication bus such as a wired controller area network (CAN). On the CAN, a component can broadcast data and/or control to the CAN which can be received by other components. For example, the HMI device 340 can transmit or broadcast user's input to the CAN, the telematics device 320 can transmit or broadcast location data (e.g., latitude, longitude, altitude, and current time) to the CAN, the controller 350 can transmit or broadcast control parameters (for controlling or configuring other components of the APU, the TCCS, etc.) to the CAN, the remote controller 360 can transmit or broadcast prime mover's sensor data and/or outputs to the CAN. In an embodiment, the components such as the telematics device 320, the HMI device 340, the remote controller 360, and the controller 350 can receive data corresponding to the component from the CAN. For example, the remote controller 360 can transmit or broadcast the prime mover's data such as the RPM, the coolant temperature, etc. to the CAN; the controller 350 can receive such data from the CAN and make decisions based on such data according to an internal control logic, and then transmit or broadcast the decisions in a form of commands back to the CAN for the remote controller 360 to follow or execute.

In an embodiment, the GPS receiver (e.g., within the telematics device 320) receives the data or signals from the satellite 310 to determine the latitude, longitude, altitude, and current time of receiving the data or signals. The GPS receiver (or the telematics device 320) then transmit or broadcast the latitude, longitude, altitude, and/or current time to the CAN. The controller 350 (as a data consumer) receives or reads the altitude data from the CAN.

In an embodiment, the controller 350 is configured to determine the power output upper limit for the prime mover of the APU, based on a predefined correlation between the altitude and the power output upper limit for the prime mover of the APU. It is to be understood that a different altitude may correspond to a different power output upper limit. In an embodiment, the controller 350 is configured to make control decisions about power consuming devices (of the APU or TCCS) to be enabled or disabled, to meet the power output upper limit requirement and/or to optimize the power output of the prime mover of the APU, so that the power output of the prime mover of the APU can be maximized while still not to exceed the power output upper limit. The controller 350 is then transmit or broadcast such control decisions (e.g., in a form of enabling and/or disabling commands) to the CAN, and the remote controller 360 is configured to receive or read such commands. The remote controller 360 is configured to execute such commands to enable and/or disable the power consuming devices (of the APU or TCCS) so that the power output of the prime mover of the APU remains within the power output upper limit. It is to be understood that the above processes can continuously rerun to ensure continuous adherence to the power output upper limit (i.e., the power output of the prime mover of the APU being not to exceed the power output upper limit).

Figure 4:
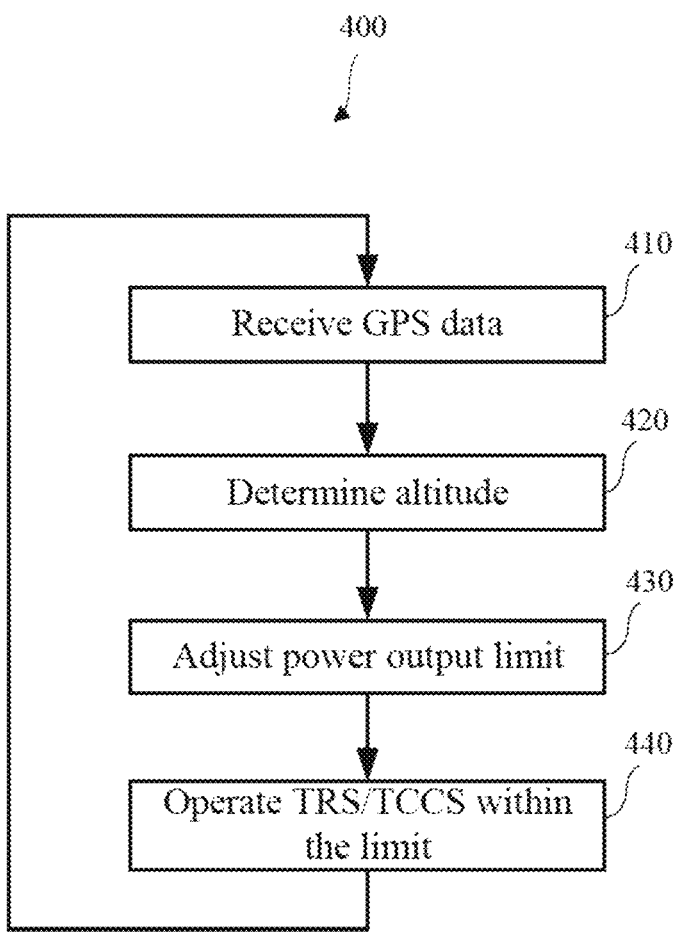
FIG. 4 is a flow chart illustrating a method of controlling an operation of a transport power system, according to an embodiment.

FIG. 4 is a flow chart illustrating a method 400 of controlling an operation of a transport power system (e.g., an APU, a TCCS, etc.), according to an embodiment.

It is to be understood that the method 400 disclosed herein can be conducted by a controller (e.g., the controller of the transport refrigeration unit/system of FIGS. 1A and 1C, the controller of the APU of FIG. 1B, the control module of FIG. 2, the controller of FIG. 3, or any suitable processor(s)), unless otherwise specified. The controller can include a processor, memory, and/or communication ports to communicate with e.g., other components of the TCCS or APU or with equipment or systems located in proximity to the TCCS or APU or a cargo load. The controller can communicate with other components using e.g., powerline communications, Pulse Width Modulation (PWM) communications, Local Interconnect Network (LIN) communications, Controller Area Network (CAN) communications, etc., and using any suitable communications including wired and/or wireless, analog and/or digital communications. In an embodiment, the communication can include communications over telematics (e.g., the telematics device 320 of FIG. 3) of the TCCS or APU, which the TCCS or APU may include or which may be communicatively connected to the TCCS (e.g., telematics equipment, mobile phone, vehicle communication system, etc.). The TCCS or APU can include sensors (e.g., temperature, pressure, humidity, motion, voltage, current, battery status, battery charging level, or the like) or the TCCS or APU can communicate with sensors associated or embedded with a cargo. The controller can obtain data sensed by the sensors and control the settings of the components (e.g., of the prime mover 246) of the TCCS or APU.

It is to be understood that the method 400 can include one or more operations, actions, or functions depicted by one or more blocks. Although illustrated as discrete blocks, various blocks may be divided into additional blocks, combined into fewer blocks, or eliminated, depending on the desired implementation. The method 400 begins at 410.

At 410 (Receive GPS data), the controller is configured to determine whether there is a GPS receiver. When there is a GPS receiver, the GPS receiver is configured to receive GPS data (latitude, longitude, and/or altitude of the GPS receiver; current time of receiving the GPS data; etc.) from the satellite. The GPS receiver is configured to transmit or broadcast the GPS data to the CAN. The controller is configured to receive or read the GPS data (e.g., the altitude of the GPS receiver or the system relative to sea level) from the CAN. When there is no GPS receiver, no action is to be taken at 410. The method 400 proceeds to 420.

At 420 (Determine altitude), the controller is configured to determine an altitude of the transport power system based on the GPS data received (if there is a GPS receiver). It is to be understood that the process of 420 (e.g., in the first iteration) can be performed e.g., during a start-up sequence of the transport power system prior to running of the prime mover of the transport power system or during other process sequence. It is also to be understood that the process of 420 (e.g., in the iterations other than the first iteration) can be performed during the running of the prime mover of the transport power system. If there is no GPS sensor, the controller is configured to determine whether there is a pressure sensor and to determine the altitude of the transport power system based on pressure data e.g., the absolute pressure data (e.g., measured by the pressure sensor 266 of FIG. 2) which can be a function of altitude. For example, the controller can determine or deduce an altitude based on the sensed absolute pressure (e.g., via a look-up table, or the like). If there is no pressure sensor, the controller is configured to determine the altitude using a predetermined altitude (e.g., 5,500 feet elevation above sea level, etc.).

It is to be understood that when the prime mover used for operating the vehicle is running, the prime mover (e.g., a diesel engine of the transport power system, or the like) disclosed herein typically can be off; and when the prime mover of disclosed herein is running, prime mover used for operating the vehicle can be off. That is, during a start-up sequence (of the transport power system or of the prime mover of the transport power system) or during other process sequence, the prime mover used for operating the vehicle is off, the vehicle is in stationary, and the altitude of the vehicle (and the transport power system) is not changing (i.e., staying constant) throughout e.g., the entire time period when the transport power system or the prime mover of the transport power system is running. The start-up sequence can be referred to or defined as a sequence of actions that initialize the transport power system and prepare for a start of the prime mover of the transport power system (i.e., prior to running of the prime mover of the transport power system). During the start-up sequence, typically the prime mover of the APU of the transport power system is not started yet. The method 400 proceeds to 430.

At 430 (Adjust power output limit), the controller is configured to adjust a power output upper limit for the prime mover of the transport power system based on the altitude determined at 420.

It is to be understood that the transport power system and the prime mover of the transport power system can be bound by emissions regulations. For example, one of the emissions regulations is not to exceed (NTE, a regulation threshold that limits power output for emissions) limit. The NTE limit can be a power level that the transport power system or the transport power system prime mover are not allowed to exceed, because above such power level, the emissions of the prime mover can be too high to meet the regulation requirements. In an embodiment, for a particular transport power system, a 2-cylinder diesel engine that is rated with the Environmental Protection Agency (EPA) can be a full power (e.g., 100% power) engine and can be used as the prime mover of the transport power system, but the NTE limit can be a derated power at a certain altitude. The reason for the difference between these two values is that as the prime mover (engine) of the transport power system is used at higher altitude, the emissions performance may decrease. The NTE value can be the power limit (e.g., the power output upper limit) of the prime mover at a first altitude (e.g., at or about 5,500 feet above sea level). Without altitude sensing capability (e.g., no sensor to detect or deduce altitude), an assumption (that the transport power system/vehicle is always at the first altitude) may have to be made so that the NTE is at or below the derated power level, to avoid potential violation of the emissions regulations. That is, the transport power system (or the prime mover of the transport power system) may be under-utilized e.g., at an altitude lower than the first altitude where the emissions performance may increase compared with the emissions performance at the first altitude.

To account for the under-utilization issue, the altitude determined at 420 can be used for the controller to adjust a power output upper limit (e.g., the NTE limit) for the prime mover of the transport power system. For example, at the first altitude (e.g., at or about 5,500 feet above sea level), the power output upper limit (e.g., the power limit or the NTE limit) of the prime mover of the transport power system can be at the derated power, to meet certain emissions regulation requirements. As the prime mover is used at higher altitude, the emissions performance decreases. That is, when the prime mover is used at lower altitude, the emissions performance increases. For example, when the altitude of the transport power system/vehicle decreases from the first altitude, the emissions performance of the prime mover of the transport power system increases, and the power output upper limit (e.g., the power limit or the NTE limit) of the prime mover of the transport power system can be greater than the derated power (e.g., up to the maximum capability of the prime mover at the full power at sea level), to meet the same emissions regulation requirements.

In an embodiment, to meet the same emissions regulation requirements, the controller can increase a power output upper limit (e.g., the NTE limit) for the prime mover of the transport power system (up to e.g., up to the maximum capability of the prime mover) when the altitude of the transport power system decreases; and the controller can decrease the power output upper limit (e.g., the NTE limit) for the prime mover of the transport power system when the altitude of the transport power system increases.

It is to be understood that the controller can determine the power output upper limit (e.g., the NTE limit) for the prime mover of the transport power system based on the altitude e.g., using an altitude versus power curve or map, and/or using a lookup table, etc., so that the controller can control the allowable power of the transport power system below or within the limit level (i.e., set the limit as the maximum power that the transport power system can operate). The curve or map can be based on the manufacture specification, experimental results, simulation or the like.

It is to be understood that because of the altitude features disclosed herein, additional power of the prime mover of the transport power system can be used, allowing to utilize e.g., additional cooling power or battery charging power, while without the altitude features, the power consumption thereof may need to be managed and reduced. The method 400 proceeds to 440.

At 440 (Operate APU within the limit), the controller is configured to control an operation of the prime mover of the transport power system (TPS) or an operation of the transport power system so that the power output of the prime mover of the transport power system or the power output of the transport power system does not exceed the power output upper limit (e.g., adjusted/increased/decreased at 430).

It is to be understood that the higher the altitude, the less air density, the less total exhaust resistance, the particulate matter increases, and the allowable power (i.e., the power output limit) might have to go down (since more power associated with higher particulate matter). For example, at the first altitude (e.g., at or about 5,500 feet above sea level), the controller can determine a power output upper limit (e.g., 5.2 kilowatts) of the prime mover of the APU. When the altitude decreases (from the first altitude), the controller can increase the power output upper limit (e.g., to a number greater than 5.2 kilowatts) for the same operation condition of the prime mover of the APU. At another altitude (e.g., at or about sea level), the controller can determine a power output upper limit (e.g., 6.7 kilowatts) for the prime mover of the APU based on such altitude for the same operation condition of the APU. When the altitude increases (from such altitude), the controller can decrease the power output upper limit for the same operation condition of the APU. For example, for at or about 3 kilowatts power output of a prime mover of a transport power system at sea level, compared with 3 kilowatts at a certain altitude (that is higher than sea level), there can be more particulate matter at such altitude than at sea level. Thus, at such altitude, if the particulate matter (emission) is to be limited, the allowable power output of the transport power system (e.g., the allowable power output of the prime mover of the transport power system) needs to be reduced, compared with those at sea level.

In an example embodiment, during a start-up sequence of the prime mover of the transport power system or during other process sequence, a GPS receiver can be used to determine the altitude of the transport power system (e.g., based on the GPS data received at 410), which can be used to change the power output upper limit of the transport power system (e.g., to allow power usage over the derated power).

It is to be understood that when the power output by the prime mover of the APU or TCCS is less than the power output upper limit, more power output may be generated by the prime mover of the APU or TCCS (and optimized performance of the APU or TCCS may be achieved), and the main controller (and/or the remote controller) may enable one or more power consuming devices (e.g., cabin accessories; secondary HVAC system such as compressor, alternator, etc.) of the APU or TCCS. When the power output by the prime mover of the APU or TCCS is greater than the power output upper limit, less power output may be generated by the prime mover of the APU or TCCS (so that the power output does not exceed the power output upper limit), and the main controller (and/or the remote controller) may disable one or more power consuming devices (e.g., cabin accessories, secondary HVAC system, etc.) of the APU or TCCS. When the power output by the prime mover of the APU or TCCS is at the power output upper limit, no action is to be taken regarding the power output generated by the prime mover of the APU or TCCS.

The method 400 proceeds from 440 back to 410 for next iteration, such that the processes of the method 400 can be continuously rerun to ensure continuous adherence to power output upper limit that corresponds to the determined altitude.

Aspects:

It is to be understood that any of these aspects can be combined with each other.

Aspect 1. A transport power system comprising: a prime mover separate from and independent to a vehicle engine used for operating a vehicle; a global positioning system (GPS) receiver configured to receive GPS data; and a controller configured to communicate with the prime mover and the GPS receiver, wherein the controller is configured to: determine an altitude of the transport power system with respect to sea level based on the GPS data received by the GPS receiver during a start-up sequence of the transport power system prior to running of the prime mover or during other process sequence; determine a power output of the prime mover; adjust a power output upper limit for the prime mover based on the determined altitude; compare the power output of the prime mover and the adjusted power output upper limit; and operate the prime mover of the transport power system so as not to exceed the adjusted power output upper limit.

Aspect 2. The transport power system according to aspect 1, wherein the prime mover is a diesel engine of an auxiliary power unit.

Aspect 3. The transport power system according to aspect 1 or aspect 2, further comprising: a telematics device disposed external to the prime mover of the transport power system, wherein the telematics device includes the GPS receiver, and the controller is configured to communicate with the telematics device via a controller area network.

Aspect 4. The transport power system according to aspect 3, wherein the telematics device is a datalogger.

Aspect 5. The transport power system according to any one of aspects 1-4, wherein the controller is further configured to: compare the determined altitude with an altitude threshold; and increase the power output upper limit for the prime mover when the determined altitude is less than the altitude threshold.

Aspect 6. The transport power system according to any one of aspects 1-5, further comprising: a human-machine interface configured to receive user inputs; and a remote input-output device configured to enable or disable power consumption components based on the power output of the prime mover.

Aspect 7. The transport power system according to aspect 6, wherein the controller, the human-machine interface, the remote input-output device, and the GPS receiver are configured to communicate with each other via a controller area network.

Aspect 8. A method for controlling an operation of a transport power system, the method comprising: determining, by a controller of the transport power system, an altitude of the transport power system with respect to sea level based on global positioning system (GPS) data received by a GPS receiver during a start-up sequence of the transport power system prior to running of a prime mover of the transport power system or during other process sequence, the prime mover being separate from and independent to a vehicle engine used for operating a vehicle, the controller being configured to communicate with the prime mover and the GPS receiver; determining a power output of the prime mover; adjusting, by the controller, a power output upper limit for the prime mover based on the determined altitude; comparing the power output of the prime mover and the adjusted power output upper limit; and operating, by the controller, the prime mover of the transport power system so as not to exceed the adjusted power output upper limit.

Aspect 9. The method according to aspect 8, wherein the prime mover is a diesel engine of an auxiliary power unit.

Aspect 10. The method according to aspect 8 or aspect 9, further comprising: the controller communicating, via a controller area network, with a telematics device disposed external to the prime mover of the transport power system, wherein the telematics device includes the GPS receiver.

Aspect 11. The method according to aspect 10, wherein the telematics device is a datalogger.

Aspect 12. The method according to any one of aspects 8-11, further comprising: comparing the determined altitude with an altitude threshold; and increasing the power output upper limit for the prime mover when the determined altitude is less than the altitude threshold.

Aspect 13. The method according to any one of aspects 8-12, further comprising: a human-machine interface receiving user inputs; and a remote input-output device enabling or disabling power consumption components based on the power output of the prime mover.

Aspect 14. The method according to aspect 13, further comprising: the controller, the human-machine interface, the remote input-output device, and the GPS receiver communicating with each other via a controller area network.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A transport power system comprising:
a diesel prime mover separate from and independent to a vehicle engine used for operating a vehicle, the prime mover not being configured to move the vehicle;
a global positioning system (GPS) receiver configured to receive GPS data; and
a controller configured to communicate with the prime mover and the GPS receiver,
wherein the controller is configured to:
determine an altitude of the transport power system with respect to sea level based on the GPS data received by the GPS receiver;
determine a power output of the prime mover;
adjust a power output upper limit for the prime mover based on the determined altitude;
compare the power output of the prime mover and the adjusted power output upper limit; and
operate the prime mover of the transport power system so as not to exceed the adjusted power output upper limit.

2. The transport power system according to claim 1, further comprising:
a telematics device disposed external to the prime mover of the transport power system,
wherein the telematics device includes the GPS receiver, and the controller is configured to communicate with the telematics device via a controller area network.

3. The transport power system according to claim 2, wherein the telematics device is a datalogger.

4. The transport power system according to claim 1, wherein the controller is further configured to:
compare the determined altitude with an altitude threshold; and
increase the power output upper limit for the prime mover when the determined altitude is less than the altitude threshold.

5. The transport power system according to claim 1, further comprising:
a human-machine interface configured to receive user inputs; and
a remote input-output device configured to enable or disable power consumption components based on the power output of the prime mover.

6. The transport power system according to claim 5, wherein the controller, the human-machine interface, the remote input-output device, and the GPS receiver are configured to communicate with each other via a controller area network.

7. The transport power system according to claim 1, wherein when the prime mover is running, the vehicle engine is turned off.

8. The transport power system according to claim 7, wherein when the vehicle engine is running, the prime mover is turned off.

9. The transport power system according to claim 1, wherein the transport power system is an auxiliary power unit (APU) without a pressure sensor.

10. The transport power system according to claim 9, wherein the APU includes a telematics-based datalogging device, the GPS receiver is contained within the datalogging device, and the datalogging device is configured to communicate with the controller, a remote input-output device, and a human-machine interface over a controller area network (CAN).

11. The transport power system according to claim 10, wherein the controller is configured to transmit enabling or disabling commands to power consuming devices of the APU based on the adjusted power output upper limit via the CAN.

12. The transport power system according to claim 11, wherein the remote input-output device is configured to receive the enabling or disabling commands from the controller via the CAN, and to execute the enabling or disabling commands to enable or disable the power consuming devices of the APU.

13. The transport power system according to claim 12, wherein the remote input-output device is configured to transmit revolutions per minute data and coolant temperature data of the prime mover to the controller via the CAN.

14. The transport power system according to claim 13, wherein the controller is configured to receive data from the CAN, make decisions based on the received data, and transmit the decisions in a form of commands back to the CAN for the remote input-output device to execute.

15. A method for controlling an operation of a transport power system, the method comprising:
determining, by a controller of the transport power system, an altitude of the transport power system with respect to sea level based on global positioning system (GPS) data received by a GPS receiver, a diesel prime mover being separate from and independent to a vehicle engine used for operating a vehicle, the prime mover not being configured to move the vehicle, the controller being configured to communicate with the prime mover and the GPS receiver;

determining a power output of the prime mover;

adjusting, by the controller, a power output upper limit for the prime mover based on the determined altitude;

comparing the power output of the prime mover and the adjusted power output upper limit; and operating, by the controller, the prime mover of the transport power system so as not to exceed the adjusted power output upper limit.

16. The method according to claim 15, further comprising:

the controller communicating, via a controller area network, with a telematics device disposed external to the prime mover of the transport power system, wherein the telematics device includes the GPS receiver.

17. The method according to claim 16, wherein the telematics device is a datalogger.

18. The method according to claim 15, further comprising:

comparing the determined altitude with an altitude threshold; and increasing the power output upper limit for the prime mover when the determined altitude is less than the altitude threshold.

19. The method according to claim 15, further comprising:

a human-machine interface receiving user inputs; and a remote input-output device enabling or disabling power consumption components based on the power output of the prime mover.

20. The method according to claim 19, further comprising:

the controller, the human-machine interface, the remote input-output device, and the GPS receiver communicating with each other via a controller area network.

* * * * *